United States Patent
He et al.

(10) Patent No.: US 10,795,150 B2
(45) Date of Patent: Oct. 6, 2020

(54) PIXEL UNIT, DISPLAY SUBSTRATE AND DISPLAY PANEL

(71) Applicants: BOE TECHNOLOGY GROUP CO., LTD., Beijing (CN); CHENGDU BOE OPTOELECTRONICS TECHNOLOGY CO., LTD., Sichuan (CN)

(72) Inventors: Wei He, Beijing (CN); Qing Chang, Beijing (CN); Lixia Huang, Beijing (CN); Jian Yang, Beijing (CN); Xinghua Li, Beijing (CN)

(73) Assignees: BOE TECHNOLOGY GROUP CO., LTD., Beijing (CN); CHENGDU BOE OPTOELECTRONICS TECHNOLOGY CO., LTD., Sichuan (CN)

( * ) Notice: Subject to any disclaimer, the term of this patent is extended or adjusted under 35 U.S.C. 154(b) by 256 days.

(21) Appl. No.: 16/010,582

(22) Filed: Jun. 18, 2018

(65) Prior Publication Data
US 2019/0018232 A1 Jan. 17, 2019

(30) Foreign Application Priority Data
Jul. 12, 2017 (CN) .......................... 2017 1 0565177

(51) Int. Cl.
*G02B 26/08* (2006.01)
*G02B 5/28* (2006.01)
(Continued)

(52) U.S. Cl.
CPC ......... *G02B 26/0833* (2013.01); *G02B 5/201* (2013.01); *G02B 5/284* (2013.01); *G02B 26/023* (2013.01)

(58) Field of Classification Search
CPC .. G02B 26/0833; G02B 26/023; G02B 5/201; G02B 5/284
(Continued)

(56) References Cited

U.S. PATENT DOCUMENTS

2004/0217919 A1* 11/2004 Piehl .................... B81B 3/0008
345/31
2011/0114974 A1* 5/2011 Song ................... H01L 51/5271
257/89
(Continued)

FOREIGN PATENT DOCUMENTS

CN      101666908 A      3/2010
CN      103050630 A      4/2013
(Continued)

OTHER PUBLICATIONS

First Office Action for Chinese Patent Application No. 201710565177.X dated Jan. 18, 2019.

*Primary Examiner* — Euncha P Cherry
(74) *Attorney, Agent, or Firm* — Calfee, Halter & Griswold LLP

(57) ABSTRACT

The present disclosure provides a pixel unit including a plurality of sub-pixels of different colors. Each sub-pixel includes a first transflective layer, a wavelength selective cavity, and a second transflective layer disposed successively along an incident light direction. A height of the wavelength selective cavity of each sub-pixel in the incident light direction is designed so as to select light having a wavelength corresponding to a color of the sub-pixel from light which is incident through the first transflective layer and reflected between the first transflective layer and the second transflective layer, and selected light exits through the second transflective layer. The present disclosure further provides a display substrate and a display panel.

20 Claims, 4 Drawing Sheets

(51) Int. Cl.
    *G02B 26/02*     (2006.01)
    *G02B 5/20*     (2006.01)

(58) Field of Classification Search
    USPC ........................................................ 359/201.2
    See application file for complete search history.

(56) References Cited

U.S. PATENT DOCUMENTS

| | | |
|---|---|---|
| 2013/0140533 A1 | 6/2013 | Lee et al. |
| 2014/0117315 A1 | 5/2014 | Kim et al. |
| 2016/0335939 A1 | 11/2016 | Yang et al. |

FOREIGN PATENT DOCUMENTS

| | | |
|---|---|---|
| CN | 103163672 A | 6/2013 |
| CN | 103794622 A | 5/2014 |
| CN | 104795046 A | 7/2015 |
| CN | 106229330 A | 12/2016 |

\* cited by examiner

PIXEL UNIT, DISPLAY SUBSTRATE AND DISPLAY PANEL

RELATED APPLICATION

The present application claims the benefit of Chinese Patent Application No. 201710565177.X, filed on Jul. 12, 2017, the entire disclosure of which is incorporated herein by reference.

FIELD

The present disclosure relates to the field of display technologies, and particularly to a pixel unit, a display substrate and a display panel.

BACKGROUND

A micro electro mechanical system (MEMS) generally includes a micro sensor, a micro actuator, a micro architecture, and a corresponding micro-processing circuit. The MEMS is a stand-alone intelligent system that can be mass-produced, and the system size is a few millimeters or even less. The size of an internal structure of the MEMS is generally on the order of microns or even nanometers.

Currently, the MEMS has three main development directions in the display field: a digital micro mirror device (DMD) display technology, an interferometer modulator (IMOD) display technology, and a digital micro shutter (DMS) display technology.

In the course of carrying out the present disclosure, the inventors of the present disclosure have found that in existing IMOD display technology, a height of a cavity for forming optical interference is controlled by using a voltage applied to a pair of conductive plates. This control manner requires an additional control unit, which complicates the device structure, has a high cost, and is difficult to control.

SUMMARY

In view of the above, an objective of embodiments of the present disclosure is to provide an improved pixel unit, a display substrate, and a display panel.

An aspect of the present disclosure provides a pixel unit comprising a plurality of sub-pixels of different colors, each sub-pixel including a first transflective layer, a wavelength selective cavity, and a second transflective layer disposed successively along an incident light direction. A height of the wavelength selective cavity of each sub-pixel in the incident light direction is designed so as to select light having a wavelength corresponding to a color of the sub-pixel from light which is incident through the first transflective layer and reflected between the first transflective layer and the second transflective layer, and selected light exits through the second transflective layer.

According to some embodiments, the first transflective layers of the plurality of sub-pixels are coplanar, and the second transflective layers of the plurality of sub-pixels are non-coplanar, or vice versa.

According to some embodiments, the pixel unit further comprises a support between adjacent sub-pixels and separating wavelength selective cavities of the adjacent sub-pixels, wherein a surface of the support close to one of the first transflective layer and the second transflective layer has a stepped shape.

According to some embodiments, each sub-pixel further comprises a movable shielding layer on a light incident side of the first transflective layer, the movable shielding layer is movable in a direction perpendicular to the incident light direction and configured to adjust the amount of light incident on the first transflective layer.

According to some embodiments, the movable shielding layer of each sub-pixel includes a first shield and a second shield, the first shield and the second shield are not light-transmitting, a gap between the first shield and the second shield allows incident light to pass through, and at least one of the first shield and the second shield is movable.

According to some embodiments, an orthographic projection of at least one of the first shield and the second shield on the first transflective layer at least partially overlaps an orthographic projection of the support on the first transflective layer.

According to some embodiments, a sectional shape of at least one of the first shield and the second shield in the direction perpendicular to the incident light direction is selected from a group comprising rectangle, semicircle, semiellipse, triangle, and sawtoothed shape.

According to some embodiments, a sectional shape of the wavelength selective cavity in a direction perpendicular to the incident light direction is selected from a group comprising square, rectangle, circle, ellipse, and rhomb.

According to some embodiments, the height of the wavelength selective cavity in the incident light direction is adjustable.

According to some embodiments, the pixel unit further comprises an absorption layer between the first transflective layer and the support.

According to some embodiments, the pixel unit further comprises a transparent substrate on a light incident side of the first transflective layer.

According to some embodiments, the pixel unit further comprises a planarization layer on a light exit side of the second transflective layer.

According to some embodiments, the pixel unit further comprises a protective layer on a light exit side of the planarization layer.

According to some embodiments, the pixel unit further comprises a light shielding portion between the support and the first transflective layer, wherein an orthographic projection of the light shielding portion on the first transflective layer at least partially overlaps an orthographic projection of the support on the first transflective layer.

According to some embodiments, the pixel unit further comprises a light shielding portion embedded in the first transflective layer, wherein an orthographic projection of the support on the first transflective layer at least partially overlaps the light shielding portion.

According to some embodiments, the support comprises a black photoresist material.

According to some embodiments, the plurality of sub-pixels are arranged along a direction perpendicular to the incident light direction, and the heights of the wavelength selective cavities of the plurality of sub-pixels in the incident light direction progressively increase along the arrangement direction of the plurality of sub-pixels.

According to some embodiments, the plurality of sub-pixels are a red sub-pixel, a green sub-pixel, and a blue sub-pixel.

Another aspect of the present disclosure provides a display substrate comprising a plurality of pixel units described above which are arranged in an array.

A further aspect of the present disclosure provides a display panel comprising the display substrate described above.

DETAILED DESCRIPTION

To make the objectives, technical solutions, and advantages of the present disclosure clearer, the present disclosure will be further described in detail below in conjunction with specific embodiments and with reference to the accompanying drawings.

It is to be noted that all the expressions using "first" and "second" in embodiments of the present disclosure are for distinguishing two different entities or different parameters. The use of the terms "first" and "second" is merely for convenience of description and should not be interpreted as a limitation on embodiments of the present disclosure. This will not be explained again in the following embodiments.

Figure 1:
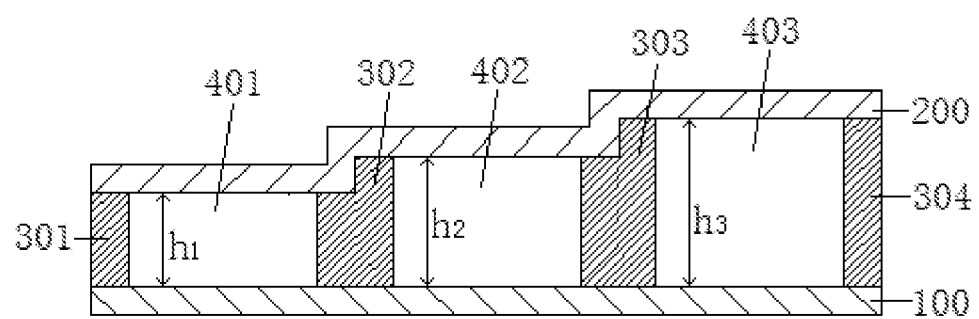
FIG. 1 is a schematic structural view of a pixel unit provided by an embodiment of the present disclosure.

Based on the above objective, according to an aspect of embodiments of the present disclosure, there is proposed a pixel unit that can simplify the device structure and reduce the control difficulty. FIG. 1 illustrates a schematic structural view of a pixel unit provided by an embodiment of the present disclosure.

As shown in FIG. 1, the pixel unit comprises a plurality of sub-pixels of different colors. Each sub-pixel includes a first transflective layer 100, a wavelength selective cavity 401, 402, 403, and a second transflective layer 200 disposed successively along an incident light direction (the direction from bottom to top in FIG. 1). A height of the wavelength selective cavity 401, 402, 403 of each sub-pixel in the incident light direction is designed so as to select light having a wavelength corresponding to a color of the sub-pixel from light that is incident through the first transflective layer 100 and reflected between the first transflective layer 100 and the second transflective layer 200, and selected light exits through the second transflective layer. Being reflected back and forth between the first transflective layer 100 and the second transflective layer 200, light incident through the first transflective layer 100 interferes in the wavelength selective cavity 401, 402, 403 and forms a standing wave. Only light with a selected wavelength interferes constructively in the wavelength selective cavity 401, 402, 403 and can exit from the second transflective layer 200, while light with other wavelengths interfere destructively in the wavelength selective cavity 401, 402, 403. Therefore, light with a corresponding specific color exits from the second transflective layer 200 of each sub-pixel.

As used herein, the term "transflective layer" refers to a layer that has both transmissive and reflective properties. According to actual needs, light incident on the transflective layer can be reflected and transmitted at any ratio, and is not limited to being accurately reflected at 50% and transmitted at 50%. Specifically, the reflectances of the first transflective layer 100 and the second transflective layer 200 can be determined according to the effect to be achieved.

The wavelength selective cavity 401, 402, 403 can be filled with any material that enables wavelength selection. In particular, in order to minimize the absorption of light by the wavelength selective cavity 401, 402, 403, the wavelength selective cavity 401, 402, 403 may be filled with air or may be vacuum. In this case, as shown in FIG. 1, the wavelength selective cavities 401, 402, 403 of adjacent sub-pixels may be separated by supports 302, 303 to maintain the height of the wavelength selective cavity 401, 402, 403 of each sub-pixel. As shown in FIG. 1, the first transflective layers 100 of the plurality of sub-pixels in the pixel unit are coplanar, and the second transflective layers 200 of the plurality of sub-pixels in the pixel unit are non-coplanar. In this case, top surfaces of the supports 302, 303 between the wavelength selective cavities 401, 402, 403 of adjacent sub-pixels may have a stepped shape to accommodate different heights of the wavelength selective cavities of adjacent sub-pixels.

In an alternative embodiment of the present disclosure, the second transflective layers 200 of the plurality of sub-pixels in the pixel unit may be coplanar, and the first transflective layers 100 of the plurality of sub-pixels in the pixel unit are non-coplanar. In this case, bottom surfaces of the supports 302, 303 between the wavelength selective cavities 401, 402, 403 of adjacent sub-pixels may have a stepped shape to accommodate different heights of the wavelength selective cavities of adjacent sub-pixels.

It is to be noted that the support may be omitted in embodiments where the wavelength selective cavities 401, 402, 403 are filled with other filling material capable of maintaining its own height. In an exemplary embodiment, the stepped surfaces of the supports 302 and 303 may be implemented by a half-tone mask technique.

In a further embodiment of the present disclosure, the height of the wavelength selective cavity of each sub-pixel in the pixel unit is adjustable. For example, a telescopic height of the support can be adjusted by a control circuit so that the wavelength of the light selected by the wavelength selective cavity of each sub-pixel varies as needed to realize different color schemes.

As shown in FIG. 1, the pixel unit may further comprise a first support 301 and a second support 304 on both sides of the pixel unit. The first support 301 has a first height $h_1$ corresponding to the wavelength selective cavity 401. The support 302 has a stepped surface so that it has both the first height $h_1$ and a second height $h_2$ corresponding to the wavelength selective cavities 401 and 402 respectively. The support 303 has a stepped surface so that it has both the second height $h_2$ and a third height $h_3$ corresponding to the wavelength selective cavities 402 and 403 respectively. The second support 304 has the third height $h_3$ corresponding to the wavelength selective cavity 403. By setting such a support assembly, the manufacturing process is simpler while the three wavelength selective cavities having different heights are better implemented. Of course, those skilled in the art will recognize that, although FIG. 1 schematically illustrates that the heights of the wavelength selective cavities progressively increase, it is not excluded that other implementing manners may be used to arrange the wavelength selective cavities. For example, the highest wavelength selective cavity may be disposed in the middle or on the left side, and so on.

The wavelength selective cavity sandwiched between the first transflective layer 100 and the second transflective layer 200 selects light having a specific wavelength using the principle of optical interference. That is, at a certain height, the wavelength selective cavity makes light with a specific wavelength have constructive interference and emits it therefrom. The specific principle may refer to the interferometer modulator (IMOD) technology. Since the heights of the respective wavelength selective cavities are different, colors of the exit light formed by reflection of the incident light in the wavelength selective cavities are different. In a pixel unit adopting the RGB color scheme, the exit light from three wavelength selective cavities of different heights may be red, green and blue. For example, the exit light from the wavelength selective cavity 401 is blue, the exit light from the wavelength selective cavity 402 is green, and the exit light from the wavelength selective cavity 403 is red. In this way, a richer display color can be achieved by mixing different proportions of red exit light, green exit light and blue exit light.

It is to be noted that although FIG. 1 schematically illustrates that the pixel unit comprises three sub-pixels, in other embodiments of the present disclosure, the pixel unit may comprise a larger or smaller number of sub-pixels. For example, in a pixel unit adopting the RGBG color scheme, four sub-pixels may be included, where the heights of the wavelength selective cavities of two green sub-pixels in the incident light direction are the same.

As can be seen from the above embodiments, in the pixel unit provided by embodiments of the present disclosure, by setting the wavelength selective cavities having different heights, the incident light is selected to be light with different wavelengths in the wavelength selective cavities having different heights, thereby obtaining a multi-color display effect. The incident light of this pixel unit can be obtained by ambient light, so that power consumption can be greatly reduced. At the same time, thanks to the simple structure of the pixel unit and the lower process difficulty, the manufacturing cost can be effectively reduced.

In particular, the above pixel unit can be applied to the IMOD display technology, so that the manufacturing cost and control difficulty of the IMOD display device can be better reduced. The IMOD display technology is a reflective display technology that enables clear and sharp display even when exposed to sunlight. The process of exhibiting color by the IMOD display technology follows the same principle as glittering of butterfly wings. A display device based on the IMOD technology does not require a backlight source, so the IMOD technology has significantly low power consumption performance compared to other display technologies and can significantly extend the battery life of the device.

Figure 2:
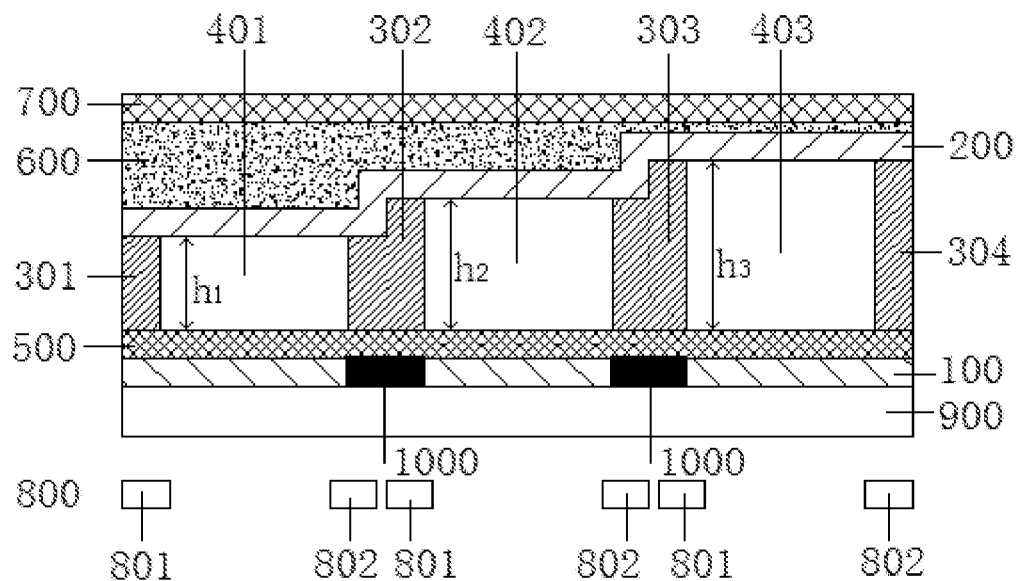
FIG. 2 is a schematic structural view of a pixel unit provided by another embodiment of the present disclosure.

FIG. 2 illustrates a schematic structural view of a pixel unit provided by another embodiment of the present disclosure.

As shown in FIG. 2, the pixel unit comprises a plurality of sub-pixels of different colors. Each sub-pixel includes a first transflective layer 100, a wavelength selective cavity 401, 402, 403, and a second transflective layer 200 disposed successively along an incident light direction (the direction from bottom to top in FIG. 2). A height of the wavelength selective cavity 401, 402, 403 of each sub-pixel in the incident light direction is designed so as to select light having a wavelength corresponding to a color of the sub-pixel from light that is incident through the first transflective layer 100 and reflected between the first transflective layer 100 and the second transflective layer 200, and the selected light exit through the second transflective layer 200. Being reflected back and forth between the first transflective layer 100 and the second transflective layer 200, light incident through the first transflective layer 100 interferes in the wavelength selective cavity 401, 402, 403 and forms a standing wave. Only light with a selected wavelength interferes constructively in the wavelength selective cavity 401, 402, 403 and can exit from the second transflective layer 200, while light with other wavelengths interfere destructively in the wavelength selective cavity 401, 402, 403. Therefore, light having a corresponding specific color is emitted from the second transflective layer 200 of each sub-pixel.

Different from the embodiment shown in FIG. 1, the pixel unit shown in FIG. 2 further comprises a transparent substrate 900 on a light incident side of the first transflective layer 100. The transparent substrate 900 may be glass, and may also be made of a flexible material such as a polymer resin. The transparent substrate 900 is configured to support the pixel unit and does not affect the incident light being incident on the first transflective layer 100.

The wavelength selective cavity 401, 402, 403 can be filled with any material that enables wavelength selection. In particular, in order to minimize the absorption of light by the wavelength selective cavity 401, 402, 403, the wavelength selective cavity 401, 402, 403 may be filled with air or may be vacuum. In this case, as shown in FIG. 2, the wavelength selective cavities 401, 402, 403 of adjacent sub-pixels may be separated by supports 302, 303 to maintain the height of the wavelength selective cavity 401, 402, 403 of each sub-pixel. As shown in FIG. 2, the first transflective layers 100 of the plurality of sub-pixels in the pixel unit are coplanar, and the second transflective layers 200 of the plurality of sub-pixels in the pixel unit are non-coplanar. In this case, top surfaces of the supports 302, 303 between the wavelength selective cavities 401, 402, 403 of adjacent sub-pixels may have a stepped shape to accommodate different heights of the wavelength selective cavities of adjacent sub-pixels.

In an alternative embodiment of the present disclosure, the second transflective layers 200 of the plurality of sub-pixels in the pixel unit may be coplanar, and the first transflective layers 100 of the plurality of sub-pixels in the pixel unit are non-coplanar. In this case, bottom surfaces of the supports 302, 303 between the wavelength selective cavities 401, 402, 403 of adjacent sub-pixels may have a stepped shape to accommodate different heights of the wavelength selective cavities of adjacent sub-pixels.

It is to be noted that the support may be omitted in embodiments where the wavelength selective cavities 401, 402, 403 are filled with other filling material capable of maintaining its own height. In an exemplary embodiment, the stepped surfaces of the supports 302 and 303 may be implemented by a half-tone mask technique.

In a further embodiment of the present disclosure, the height of the wavelength selective cavity of each sub-pixel in the pixel unit is adjustable. For example, a telescopic height of the support can be adjusted by a control circuit, so that the wavelength of the light selected by the wavelength selective cavity of each sub-pixel varies as needed to realize different color schemes.

As shown in FIG. 2, the pixel unit further comprises a first support 301 and a second support 304 on both sides of the pixel unit. The first support 301 has a first height $h_1$ corresponding to the wavelength selective cavity 401. The support 302 has a stepped surface so that it has both the first height $h_1$ and a second height $h_2$ corresponding to the wavelength selective cavities 401 and 402 respectively. The support 303 has a stepped surface so that it has both the second height $h_2$ and a third height $h_3$ corresponding to the wavelength selective cavities 402 and 403 respectively. The second support 304 has the third height $h_3$ corresponding to the wavelength selective cavity 403. By setting such a support assembly, the manufacturing process is simpler while three wavelength selective cavities having different heights are better implemented. Of course, those skilled in the art will recognize that, although FIG. 2 schematically illustrates that the heights of the wavelength selective cavities progressively increase, it is not excluded that other implementing manners may be used to arrange the wavelength selective cavities. For example, the highest wavelength selective cavity may be disposed in the middle or on the left side, and so on.

The wavelength selective cavity sandwiched between the first transflective layer 100 and the second transflective layer 200 selects light with a specific wavelength using the principle of optical interference. That is, at a certain height, the wavelength selective cavity makes light with a specific wavelength have constructive interference, and emits it therefrom. The specific principle may refer to the IMOD. Since the heights of the respective wavelength selective cavities are different, the colors of the exit light formed by reflection of the incident light in the wavelength selective cavities are different. In a pixel unit adopting the RGB color scheme, the exit light from the three wavelength selective cavities of different heights may be red, green and blue. For example, the exit light from the wavelength selective cavity 401 is blue, the exit light from the wavelength selective cavity 402 is green, and the exit light from the wavelength selective cavity 403 is red. In this way, a richer display color can be achieved by mixing different proportions of red exit light, green exit light and blue exit light.

It is to be noted that although FIG. 2 schematically illustrates that the pixel unit comprises three sub-pixels, in other embodiments of the present disclosure, the pixel unit may comprise a larger or smaller number of sub-pixels. For example, in the pixel unit adopting the RGBG color scheme, four sub-pixels may be included, where the heights of the wavelength selective cavities of two green sub-pixels in the incident light direction are the same.

As can be seen from the above embodiments, in the pixel unit provided by embodiments of the present disclosure, by setting the wavelength selective cavities having different heights, the incident light is selected to be light with different wavelengths in the wavelength selective cavities having different heights, thereby obtaining a multi-color display effect. The incident light of this pixel unit can be obtained through ambient light, so that power consumption can be greatly reduced. At the same time, thanks to the simple structure of the pixel unit and the lower process difficulty, the manufacturing cost can be effectively reduced.

In particular, the above pixel unit can be applied to the IMOD display technology, so that the manufacturing cost and control difficulty of the IMOD display device can be better reduced.

In an exemplary embodiment, as shown in FIG. 2, each sub-pixel may further include a movable shielding layer 800. The movable shielding layer 800 is disposed on a light incident side of the first transflective layer 100, which is movable in a direction perpendicular to the incident light direction and configured to adjust the amount of light incident on the first transflective layer 100. In this manner, by adjusting the amount of light incident on the first transflective layer 100, grayscale adjustment of each sub-pixel can be achieved.

In an exemplary embodiment of the present disclosure, as shown in FIG. 2, the movable shielding layer 800 may include a first shield 801 and a second shield 802. An orthographic projection of the first shield 801 and/or the second shield 802 on the first transflective layer 100 at least partially overlaps an orthographic projection of the support on the first transflective layer 100, as shown in FIG. 2. In this manner, the first shield 801 and/or the second shield 802 can function as a black matrix, thereby alleviating or even eliminating the problems of light leakage and light mixing of sub-pixels. In order to better shield the support, widths of the first shield 801 and/or the second shield 802 along an arrangement direction of sub-pixels can be increased.

The first shield 801 and the second shield 802 are themselves opaque to light and movable in a direction perpendicular to the incident light direction. A gap between the first shield 801 and the second shield 802 may allow the incident light to pass through. Therefore, the gap between the first shield and the second shield is adjusted by the movement of the first shield and/or the second shield, thereby adjusting the amount of light incident on the first transflective layer 100 to achieve grayscale adjustment of each sub-pixel.

It is to be noted that the sizes of the first shield 801 and the second shield 802 and the size of the gap shown in FIG. 2 are schematic. In fact, the gap between the first shield 801 and the second shield 802 can be completely closed by the movement of the first shield 801 and/or the second shield 802 so that no light is incident on the first transflective layer 100, i.e. forming a black state. When the first shield 801 and/or the second shield 802 move, the amount of light incident on the first transflective layer 100 varies with the size of the gap, thereby realizing various grayscale luminances. When the overlapping area between an orthographic projection of the gap between the first shield 801 and the second shield 802 on the first transflective layer 100 and an orthographic projection of the wavelength selective cavity on the first transflective layer 100 is largest, the amount of light incident on the first transflective layer 100 is greatest, so that luminance of the sub-pixel is highest.

In an exemplary embodiment, the movable shielding layer may be implemented by the digital micro shutter (DMS) technology. The DMS technology realizes a transitional display from a black state to a white state of sub-pixels by controlling whether a movable shutter shields a gap and how much the gap is shielded to control whether the incident light is transmitted or how much it is transmitted. A design of a switching circuit in the DMS technology can be utilized to control the movable shielding layer to move in a direction perpendicular to the incident light direction, and the amounts of exit light of different colors exiting from the wavelength selective cavities are controlled by the movement displacements of the movable shielding layer under different voltages.

It is to be noted that the first shield 801 and/or the second shield 802 may also move horizontally in a direction perpendicular to the arrangement direction of sub-pixels (i.e. a direction perpendicular to the paper surface, referring to FIG. 2) in addition to moving horizontally along the arrangement direction of sub-pixels.

In an exemplary embodiment, the pixel unit may further comprise light shielding portions sandwiched between the support and the first transflective layer 100. The light shielding portions may be located at positions corresponding to the first support 301, the support 302, the support 303, and the second support 304, respectively, and sandwiched between the corresponding support and the first transflective layer 100. Alternatively, as shown in FIG. 2, light shielding portions 1000 may be embedded in the first transflective layer 100, and the light shielding portions are located at positions corresponding to the first support 301, the support 302, the support 303, and the second support 304, respectively. By setting the light shielding portions, the problems of light leakage and light mixing of sub-pixels can be alleviated or even eliminated. The light shielding portion can be implemented using a black matrix layer or other material that can be used for light shielding.

Alternatively, the support may contain a black photoresist material to thereby alleviate or even eliminate the problems of light leakage and light mixing of sub-pixels.

Continuing to refer to FIG. 2, the pixel unit may further comprise an absorption layer 500 between the first transflective layer 100 and the wavelength selective cavity. The absorption layer 500 is configured to absorb the reflected or refracted light that does not form a standing wave in the wavelength selective cavity, thereby increasing the color purity of the exit light of each sub-pixel. If the pixel unit further comprises the light shielding portion between the support and the first transflective layer 100, the light shielding portion may be disposed between the absorption layer 500 and the support.

Further, as shown in FIG. 2, the pixel unit may further comprise a planarization layer 600 on a light exit side of the second transflective layer 200. The planarization layer 600 may be formed of a relevant planarization layer material used in a liquid crystal display device, which, on the one hand, is used to optimize the flatness of the pixel unit surface for convenience of subsequent assembly and operation, and on the other hand, can protect the second transflective layer 200.

Further, as shown in FIG. 2, the pixel unit may further comprise a protective layer 700 on a light exit side of the planarization layer 600. By setting the protective layer 700, scratch resistance and pressure resistance of the pixel unit can be increased, thereby ensuring that the pixel unit is not easily damaged by external force during use.

In the pixel unit provided by embodiments of the present disclosure, by setting the wavelength selective cavities having different heights, the incident light is selected to be light with different wavelengths in the wavelength selective cavities having different heights, thereby obtaining a multi-color display effect. The incident light of this pixel unit can be obtained through ambient light, so that power consumption can be greatly reduced. Meanwhile, thanks to the simple structure of the pixel unit and the lower process difficulty, the manufacturing cost can be effectively reduced. In addition, by setting the movable shielding layer, grayscale control of a single sub-pixel can be achieved, which reduces the difficulty in control of the wavelength selective cavity and can alleviate or even eliminate the light leakage problem at the same time.

In particular, the above pixel unit can be applied to the IMOD display technology, so that the manufacturing cost and control difficulty of the IMOD display device can be better reduced.

Figure 3A:
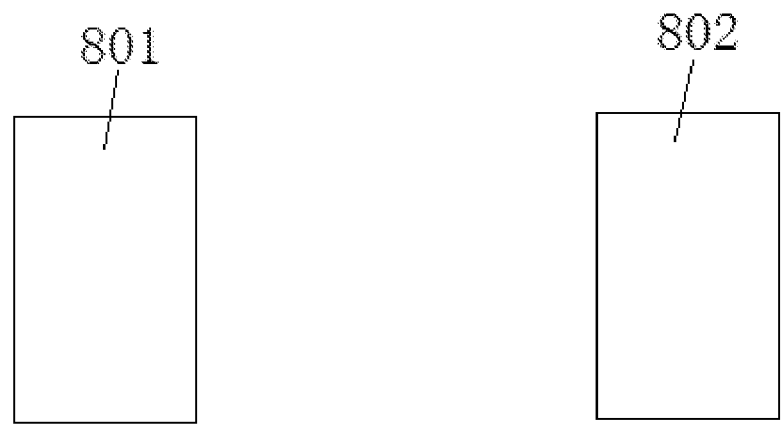
FIG. 3a is a schematic view showing a sectional shape of a shield provided by embodiments of the present disclosure.
Figure 3B:
FIG. 3b is a schematic view showing a sectional shape of a shield provided by embodiments of the present disclosure.
Figure 3C:
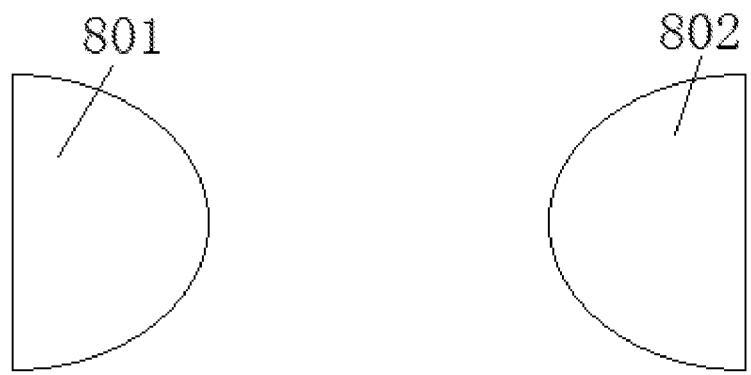
FIG. 3c a schematic view showing a sectional shape of a shield provided by embodiments of the present disclosure.
Figure 3D:
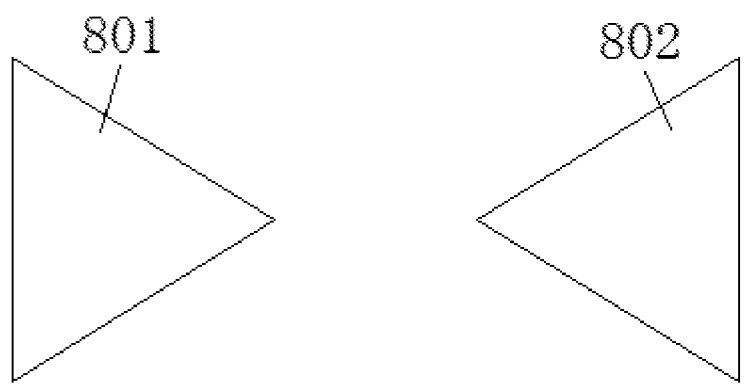
FIG. 3d is a schematic view showing a sectional shape of a shield provided by embodiments of the present disclosure.
Figure 3E:
FIG. 3e is a schematic view showing a sectional shape of a shield provided by embodiments of the present disclosure.

In various embodiments according to the present disclosure, the first shield 801 and the second shield 802 may have different sectional shapes. For example, the sectional shape of the first shield 801 and/or the second shield 802 in a direction perpendicular to the incident light direction may be rectangular (as shown in FIG. 3*a*), semicircular (as shown in FIG. 3*b*), semioval (as shown in FIG. 3*c*), triangular (as shown in FIG. 3*d*), or sawtoothed (as shown in FIG. 3*e*). In addition to the shapes enumerated above, the sectional shape of the first shield 801 and/or the second shield 802 in the direction perpendicular to the incident light direction may also be other common geometric shapes or irregular geometric shapes, which is not limited herein as long as the effect of adjusting the grayscale in the case of movement can be achieved.

Optionally, when adjacent first shield 801 and second shield 802 repel each other due to their sizes (e.g., they cannot coexist in the same plane or cannot move freely), adjacent first shield and second shield may be disposed in a staggered manner, so that they are not in the same plane to thereby make the design of sizes more free.

Figure 4A:
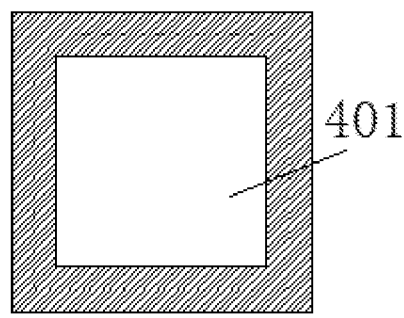
FIG. 4a is a schematic view showing a sectional shape of a wavelength selective cavity provided by embodiments of the present disclosure.
Figure 4B:
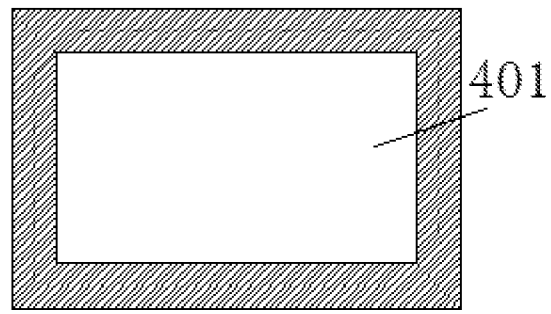
FIG. 4b is a schematic view showing a sectional shape of a wavelength selective cavity provided by embodiments of the present disclosure.
Figure 4C:
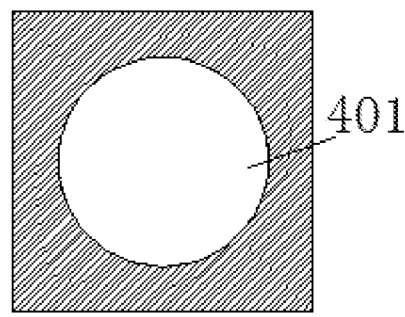
FIG. 4c is a schematic view showing a sectional shape of a wavelength selective cavity provided by embodiments of the present disclosure.
Figure 4D:
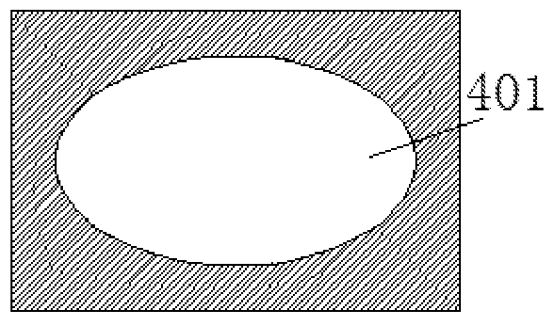
FIG. 4d is a schematic view showing a sectional shape of a wavelength selective cavity provided by embodiments of the present disclosure.
Figure 4E:
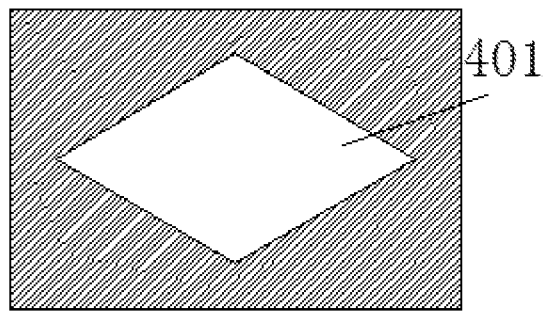
FIG. 4e is a schematic view showing a sectional shape of a wavelength selective cavity provided by embodiments of the present disclosure.

In various embodiments according to the present disclosure, the wavelength selective cavity 401, 402 or 403 may have various sectional shapes. For example, the sectional shape of the wavelength selective cavity 401, 402 or 403 in a direction perpendicular to the incident light direction may be square (as shown in FIG. 4*a*), rectangular (as shown in FIG. 4*b*), circular (as shown in FIG. 4*c*), elliptic (as shown in FIG. 4*d*), or rhomboic (as shown in FIG. 4*e*). In addition to the shapes enumerated above, the sectional shape of the wavelength selective cavity 401, 402 or 403 in the direction perpendicular to the incident light direction may also be other common geometric shapes or irregular geometric shapes, which is not limited herein as long as corresponding shielding can be realized when the first shield and/or the second shield moves so that grayscale adjustment can be achieved.

It is to be noted that although in the above embodiments, the sub-pixels of the pixel unit are laterally arranged, those skilled in the art will appreciate that, in addition to the lateral arrangement, the principle of the present disclosure also applies to pixel units consisting of sub-pixels having other sub-pixel arrangement manners such as triangular arrangement.

Another aspect of embodiments of the present disclosure provides a display substrate that can simplify the device structure and reduce the control difficulty, and comprises a plurality of any of pixel units described above, wherein the plurality of pixel units can be arranged in an array.

In the display substrate provided by embodiments of the present disclosure, by setting the wavelength selective cavities having different heights in the pixel units, the incident light is selected to be light with different wavelengths in the wavelength selective cavities having different heights, thereby obtaining a multi-color display effect. The incident light of these pixel units can be obtained through ambient light, so that power consumption can be greatly reduced. At the same time, thanks to the simple structure of the pixel unit and the lower process difficulty, the manufacturing cost can be effectively reduced.

A further aspect of embodiments of the present disclosure provides a display panel that can simplify the device structure and reduce the control difficulty, and comprises the display substrate as described above.

The above display panel may be any product or component that has display function such as electronic paper, mobile phone, tablet computer, television, notebook computer, digital photo frame, navigator, and the like.

In the display panel provided by embodiments of the present disclosure, by setting the wavelength selective cavities having different heights in the pixel units, the incident light is selected to be light with different wavelengths in the wavelength selective cavities having different heights, thereby obtaining a multi-color display effect. The incident light of these pixel units can be obtained through ambient light, so that power consumption can be greatly reduced. At the same time, thanks to the simple structure of the pixel unit and the lower process difficulty, the manufacturing cost can be effectively reduced.

It is to be noted that in the drawings, the dimensions of layers and regions may be exaggerated for clarity of illustration. It will also be understood that when an element or layer is referred to as being "on" another element or layer, it can be directly on the other element or layer, or there may be one or more intermediate layers or elements. Similarly, it will be understood that when an element or layer is referred to as being "under" another element or layer, it can be directly under the other element or layer, or there may be one or more intermediate layers or elements. In addition, it will also be understood that when a layer or element is referred to as being "between" two layers or two elements, it can be the only layer between two layers or two elements, or one or more intermediate layers or elements may also be present. Similar reference numerals denote similar elements throughout this disclosure.

In the present disclosure, the terms "first," "second," "third," and "fourth" are used for descriptive purposes only and are not to be construed as indicating or implying relative importance. The term "plurality" refers to two or more than one unless specifically limited otherwise.

It should be understood by those ordinarily skilled in the art that the above contents are only specific embodiments of the present disclosure and are not intended to limit the present disclosure. Any modifications, equivalent substitutions, improvements, and so on made within the spirit and principle of the present disclosure should all be included in the protection scope of the present disclosure.

The invention claimed is:

1. A pixel unit comprising a plurality of sub-pixels of different colors, each sub-pixel including a first transflective layer, a wavelength selective cavity, and a second transflective layer disposed successively along an incident light direction,
   wherein a height of the wavelength selective cavity of each sub-pixel in the incident light direction is designed so as to select light having a wavelength corresponding to a color of the sub-pixel from light which is incident through the first transflective layer and reflected between the first transflective layer and the second transflective layer, and selected light exits through the second transflective layer;
   wherein the pixel unit further comprises a support between adjacent sub-pixels and separating wavelength selective cavities of the adjacent sub-pixels, and the height of the wavelength selective cavity of each sub-pixel in the incident light direction is defined by the support.

2. The pixel unit according to claim 1, wherein the first transflective layers of the plurality of sub-pixels are coplanar, and the second transflective layers of the plurality of sub-pixels are non-coplanar, or the second transflective layers of the plurality of sub-pixels are coplanar, and the first transflective layers of the plurality of sub-pixels are non-coplanar.

3. The pixel unit according to claim 2, wherein a surface of the support close to one of the first transflective layer and the second transflective layer has a stepped shape.

4. The pixel unit according to claim 3, wherein each sub-pixel further comprises a movable shielding layer on a light incident side of the first transflective layer, the movable shielding layer is movable in a direction perpendicular to the incident light direction and configured to adjust the amount of light incident on the first transflective layer.

5. The pixel unit according to claim 4, wherein the movable shielding layer of each sub-pixel includes a first shield and a second shield, the first shield and the second shield are not light-transmitting, a gap between the first shield and the second shield allows incident light to pass through, and at least one of the first shield and the second shield is movable.

6. The pixel unit according to claim 5, wherein an orthographic projection of at least one of the first shield and the second shield on the first transflective layer at least partially overlaps an orthographic projection of the support on the first transflective layer.

7. The pixel unit according to claim 5, wherein a sectional shape of at least one of the first shield and the second shield in the direction perpendicular to the incident light direction is selected from a group comprising rectangle, semicircle, semiellipse, triangle, and sawtoothed shape.

8. The pixel unit according to claim 1, wherein a sectional shape of the wavelength selective cavity in a direction perpendicular to the incident light direction is selected from a group comprising square, rectangle, circle, ellipse, and rhomb.

9. The pixel unit according to claim 1, wherein the height of the wavelength selective cavity in the incident light direction is adjustable.

10. The pixel unit according to claim 3, further comprising an absorption layer between the first transflective layer and the support.

11. The pixel unit according to claim 1, further comprising a transparent substrate on a light incident side of the first transflective layer.

12. The pixel unit according to claim 1, further comprising a planarization layer on a light exit side of the second transflective layer.

13. The pixel unit according to claim 12, further comprising a protective layer on a light exit side of the planarization layer.

14. The pixel unit according to claim 3, further comprising a light shielding portion between the support and the first transflective layer, wherein an orthographic projection of the light shielding portion on the first transflective layer at least partially overlaps an orthographic projection of the support on the first transflective layer.

15. The pixel unit according to claim 3, further comprising a light shielding portion embedded in the first transflective layer, wherein an orthographic projection of the support on the first transflective layer at least partially overlaps the light shielding portion.

16. The pixel unit according to claim 3, wherein the support comprises a black photoresist material.

17. The pixel unit according to claim 1, wherein the plurality of sub-pixels are arranged along a direction perpendicular to the incident light direction, and the heights of the wavelength selective cavities of the plurality of sub-pixels in the incident light direction progressively increase along the arrangement direction of the plurality of sub-pixels.

18. The pixel unit according to claim 1, wherein the plurality of sub-pixels are a red sub-pixel, a green sub-pixel, and a blue sub-pixel.

19. A display substrate comprising a plurality of pixel units according to claim 1 which are arranged in an array.

20. A display panel comprising the display substrate according to claim 19.

* * * * *